Sept. 7, 1943.　　　　J. ARMSTRONG　　　　2,328,599
DEVICE FOR BREWING AND DISPENSING BEVERAGES
Filed Dec. 29, 1941
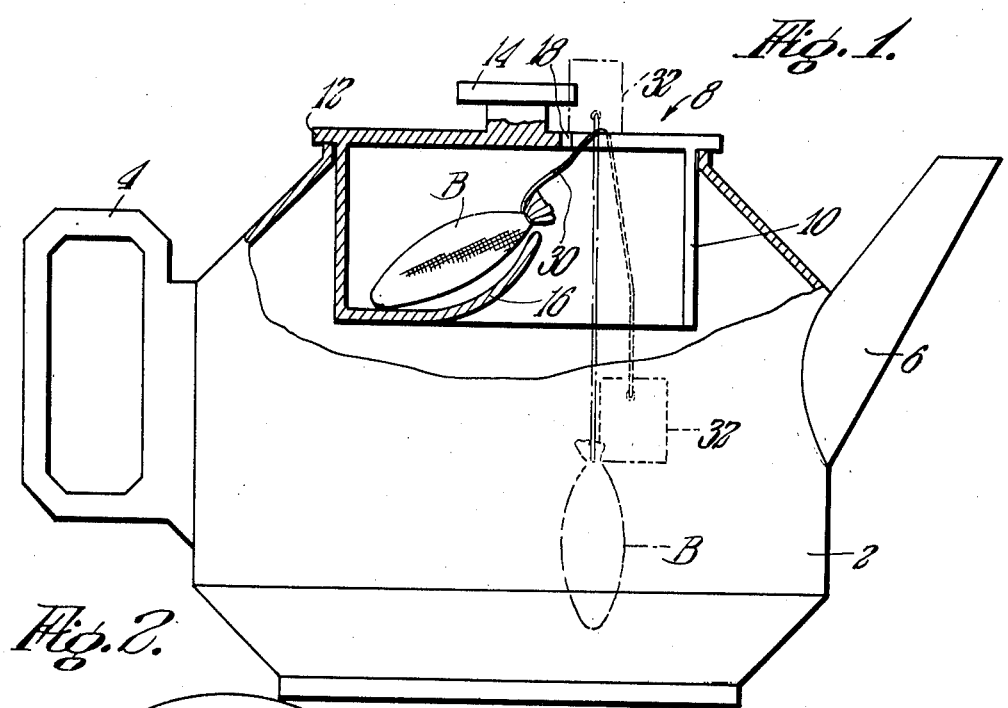
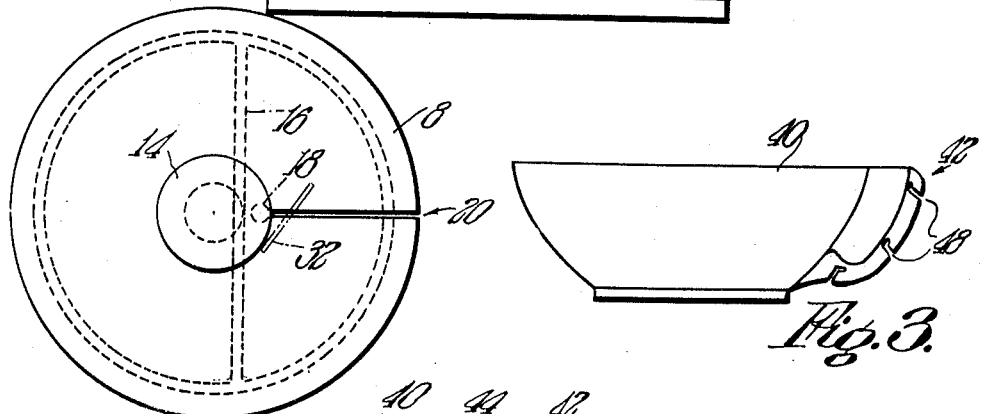
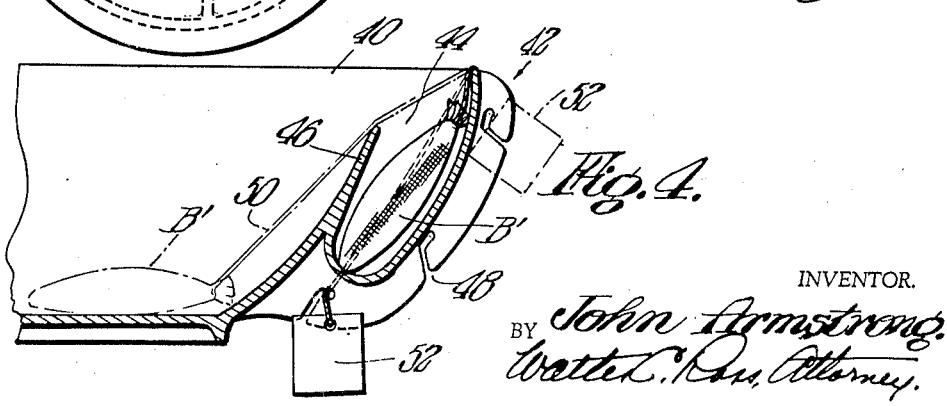
INVENTOR.
BY John Armstrong
Walter C. Raw, Attorney Patented Sept. 7, 1943

2,328,599

UNITED STATES PATENT OFFICE 2,328,599

DEVICE FOR BREWING AND DISPENSING BEVERAGES

John Armstrong, Bayonne, N. J.

Application December 29, 1941, Serial No. 424,825

1 Claim. (Cl. 53—3)

This invention relates to improvements in receptacles for brewing beverages such as tea or the like.

It is a principal object of the invention to provide a novel receptacle member in which a beverage may be brewed and from which the beverage may be dispensed or from which it may be drunk. As a special feature, the receptacle member includes means whereby a beverage-making substance may be either suspended in a brewing liquid or held away therefrom.

It is another object of the invention to provide a utensil for use in the brewing of a beverage such as hot tea, for example, whereby the user may allow the tea-bag or similar article to remain in the liquid for brewing as long as desired or remove it from contact with the liquid in order that the beverage will not be any more concentrated than the user wishes. The construction is such that when it is desired to have the tea-bag or similar article further immersed in the liquid, the same may be readily allowed to come into contact with the said liquid in the receptacle so as to thus strengthen the beverage to the degree desired.

A still further object of the invention is to provide a tea-pot or tea-cup or similar receptacle having means associated therewith whereby a tea-bag or the like may be supported in either so-called brewing or non-brewing positions. That is to say, the receptacle member is such that the tea-bag may be moved into and out of the liquid in the receptacle and it may be moved out of contact with the liquid without removing the bag or other article entirely from the receptacle as has heretofore been necessary and objectionable.

In this way, there is not only obviated the possibility of there being drippings onto the table-cloth, for example, as the tea-bag is ordinarily moved from cup or pot to some other place but the user has the further advantage of the fact that the brewing substance, whatever it may be, is closely associated with the device from which the beverage is to be dispensed so that said user may continue to permit the tea-bag or similar article to be immersed in the liquid.

As a special feature of the invention means is provided that is engageable by the retriever or cord of the tea-bag whereby said retriever is positioned so as to be readily accessible for manual engagement whereby by means of the retriever the bag may be transferred from the receptacle to a pocket therefor and vice versa, and the retriever held to position the bag.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawing wherein:

Fig. 1 is a side elevational view with parts in section for clearness of one form of a receptacle embodying the novel features of the invention;

Fig. 2 is a top plan view of the cover for the receptacle shown in Fig. 1;

Fig. 3 is a side elevational view of another form of receptacle embodying the novel features of the invention; and Fig. 4 is a partial sectional elevational view of what is shown in Fig. 3.

Referring now to the drawing more in detail, the invention will be fully described.

According to the form shown in Figs. 1 and 2 there is a receptacle member 2 in the form of a tea-pot. In general the receptacle will be essentially a beverage brewing and dispensing receptacle of any desired shape or size such as a tea-pot, coffee-making urn, cup or the like.

The receptacle 2 shown will usually have a handle member 4 and a pouring spout-like part 6. It also will have a cover member such as 8 which has a skirt or lip part 10 for extending into an opening provided in the upper side of the receptacle and a peripheral flange part 12 for resting on the rim around said opening. There may be a manually engageable part 14 for facilitating manipulation of the cover 8.

When the invention takes the form shown in Figs. 1 and 2 the cover 8 will have a lip or wall part 16 which extends inwardly and upwardly from one side of the cover as shown so as to provide what I call a pouch or pocket for a bag of brewing substance. In the form of the invention shown there is preferably a vent or opening 18 in the upper side of the cover and an elongated slot 20 is provided therein which extends from said opening 18 and opens at the marginal side edge of the cover, as shown more clearly in Fig. 2.

In use, the receptacle normally contains a liquid such as water and the tea-bag or similar brewing substance bag indicated by B, is suspended therein as shown. The bag has a suspensory or retriever in the form of a string 30 extending therefrom with a tag or the like 32 attached to the free end of the string. When it is desired to have the bag disposed in the water in the receptacle or in contact with the water or other liquid as indicated by the dot-dash lines in Fig. 1, the retriever 30 extends through slot 20 and the tag is in engagement with the portions of the cover at opposite sides of the slot so that not only is the tag thus held readily accessible but the bag is positioned as may be desired with relation to the liquid in the receptacle.

When the bag B is to be moved from the liquid the tag 32 is grasped and by means of the cord 30 the element B is elevated into the pouch or pocket, the cover being partly or wholly removed from the receptacle and manipulated over the receptacle for this purpose if necessary and desired.

Thus, it will be seen, when it is desired to move the bag out of the liquid, this may be done without entirely removing the bag from the receptacle. There is thereby obviated the possibility that drippings from the wet bag will soil the tablecloth or the like.

Another form of construction embodying the features of the invention is shown in Figs. 3 and 4. Here the receptacle takes the form of a teacup but it will be understood that the features shown and to be described could be incorporated in a tea-pot, brewing receptacle or any other utensil as well.

The cup in the form of the invention shown is designated by 40 and it has a handle member indicated generally by 42. Said receptacle or handle member 42 is formed to have a pouch or pocket 44 therein which is separated from the interior of the receptacle in some way as by a side wall 46 substantially as shown. The pouch or pocket may be as deep as may be necessary and of any size or shape for accommodating such a bag as B' or other element as may be desired.

The handle member 42 is provided with means for engaging the retriever 50 of the bag B and in the form of the invention being disclosed includes one or more notches or slots such as 48 that may be spaced apart any desired distance.

As in the form of the invention already described, the retriever or cord 50 of bag B' carries a tag 52.

In this form of the invention the bag may be disposed on the bottom of the receptacle with the cord 50 extending through the uppermost slot 48 and with the element 52 at a side thereof. When it is desired to remove the bag from the liquid and place it in the pouch or pocket the tag 52 is grasped and by means of the retriever the bag is set in the pouch with the cord extending through a lower or the lowermost notch with the element 52 at an opposite side of the handle.

There may be as many of the notches 48 as may be desired and they may be spaced apart and formed as the conditions require all within the scope of the invention.

As will be observed whether the invention is associated with any receptacle or takes the form of a brewing pot, cup or other utensil there is a pocket or pouch for receiving the bag, and means for engaging the retriever thereof so that it is held in various positions thereby making it possible to locate the bag in liquid in the receptacle or to remove it therefrom at will.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A dispensing apparatus for brewed beverage comprising in combination, a dispensing receptacle open at its upper side and having a pouring spout, a closure for said receptacle separable therefrom having a skirt for depending through the open upper side thereof and an upper wall for resting on said receptacle, a lip within and secured to and extending inwardly from the inner and lower side of the skirt terminating at a distance from the said upper wall of the closure providing a pocket for a beverage bag having an opening thereto below said upper wall, said upper wall and skirt having interconnecting slots therein terminating adjacent the opening of said pocket for the retriever cord of a beverage bag whereby a bag may be transferred by the retriever thereof between the dispensing receptacle and pocket.

JOHN ARMSTRONG.